(12) United States Patent
Mukai et al.

(10) Patent No.: US 8,680,808 B2
(45) Date of Patent: Mar. 25, 2014

(54) MOTOR DRIVE APPARATUS AND ELECTRIC POWER STEERING APPARATUS USING THE SAME

(75) Inventors: Yasuhiko Mukai, Kariya (JP); Nobuhiko Uryu, Kariya (JP)

(73) Assignee: DENSO Corporation, Kariya (JP)

( * ) Notice: Subject to any disclaimer, the term of this patent is extended or adjusted under 35 U.S.C. 154(b) by 522 days.

(21) Appl. No.: 12/984,936

(22) Filed: Jan. 5, 2011

(65) Prior Publication Data

US 2011/0163708 A1 Jul. 7, 2011

(30) Foreign Application Priority Data

Jan. 7, 2010 (JP) .................................... 2010-2062

(51) Int. Cl.
*H02P 1/46* (2006.01)
*H02P 1/50* (2006.01)
*H02P 3/18* (2006.01)

(52) U.S. Cl.
USPC ....... 318/722; 318/563; 318/564; 318/400.21

(58) Field of Classification Search
USPC .............................. 318/722, 563, 564, 400.21
See application file for complete search history.

(56) References Cited

U.S. PATENT DOCUMENTS

| | | | | |
|---|---|---|---|---|
| 5,414,339 A | * | 5/1995 | Masaki et al. | 318/800 |
| 7,277,304 B2 | * | 10/2007 | Stancu et al. | 363/71 |
| 7,372,712 B2 | * | 5/2008 | Stancu et al. | 363/71 |
| 7,977,963 B2 | * | 7/2011 | Bae et al. | 324/764.01 |
| 8,169,177 B2 | * | 5/2012 | Kishimoto | 318/490 |
| 8,228,008 B2 | * | 7/2012 | Kitanaka | 318/45 |
| 2007/0120520 A1 | * | 5/2007 | Miyazaki et al. | 318/801 |

FOREIGN PATENT DOCUMENTS

| | | |
|---|---|---|
| JP | 07-033033 | 2/1995 |
| JP | P2005-160190 A | 6/2005 |

OTHER PUBLICATIONS

Japanese Office Action dated Jan. 13, 2012, issued in corresponding Japanese Application No. 2010002062 with English Translation.

* cited by examiner

*Primary Examiner* — Erick Glass
(74) *Attorney, Agent, or Firm* — Nixon & Vanderhye P.C.

(57) ABSTRACT

A motor drive apparatus drives a motor by a first motor drive part and a second motor drive part. The first motor drive part includes a first inverter for supplying current to a first winding set. The second motor drive part includes a second inverter for supplying current to a second winding set. A control unit starts to supply currents to the first winding set and the second winding set at the same time after waiting for completion of all failure detection processing with respect to each of the first motor drive part and the second motor drive part.

9 Claims, 7 Drawing Sheets

MOTOR DRIVE APPARATUS AND ELECTRIC POWER STEERING APPARATUS USING THE SAME

CROSS REFERENCE TO RELATED APPLICATION

This application is based on and incorporates herein by reference Japanese patent application No. 2010-2062 filed on Jan. 7, 2010.

FIELD OF THE INVENTION

The present invention relates to drive control technology for a motor drive apparatus.

BACKGROUND OF THE INVENTION

Some conventional motor drive apparatuses have a plurality of motor drive parts. According to an electric motor drive apparatus disclosed in the following patent document 1, for example, a motor driver and a motor winding form a motor drive part and two motor drive parts are provided. Thus, the motor is operated to generate drive force, whichever winding of the motor drive part is energized.
Patent document 1: JP H7-33033

In some of the motor drive apparatuses having the plurality of motor drive parts, the plurality of motor drive parts is arranged in parallel to provide large rotational torque. The total value of the rotational torque provided to drive the motor is determined as a sum of rotational torque values of all the motor drive parts.

In case of generating large rotational torque in the motor drive apparatus, a large current need be supplied to the motor. The motor drive parts therefore are required to control large currents. If a certain failure occurs in the motor drive apparatus for some reasons, a large current will unexpectedly flow. It is therefore general practice to start driving the motor after checking for any failure in each of the motor drive parts.

If the motor id driven after completing the failure check operation with respect to each motor drive parts by the motor drive apparatus, the failure check operation will be completed at different time points among the plurality of motor drive parts and hence the motor drive parts will start to drive the motor at different time points. In this case, some of the motor parts will not be able to provide the rotational torque at a time point immediately after starting the motor drive operation. As a result, the motor will not be able to generate the initially determined torque, which corresponds to the sum of the drive forces of the motor drive parts, for a certain period. That is, the motor will not be able to be driven and controlled appropriately for the certain period immediately after the motor drive operation is started.

SUMMARY OF THE INVENTION

It is therefore an object of the present invention to provide a motor drive apparatus, which is capable of controlling a motor appropriately even in a period immediately after starting a motor drive operation, and an electric power steering apparatus using such a motor drive apparatus.

According to the present invention, a motor drive apparatus has a plurality of motor drive parts and a control unit. The motor drive parts include as many as "n" motor drive parts. "n" is an integer equal to or greater than 2. Each of the motor drive parts includes a winding set of a motor and an inverter for supplying current to the winding set. The control unit is configured to check whether failure is present with respect to each of the plurality of motor drive parts and control current supply to the winding set through the inverter in each of the plurality of motor drive parts. The control unit is configured to execute as many as "m" failure detection processing with respect to each of the plurality of motor drive parts. "m" is an integer equal to or greater than 1. The control unit is configured to start the current supply to each winding set of the plurality of motor drive parts at the same time after completion of execution of all the failure detection processing with respect to all of the plurality of motor drive parts.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

The present invention will be described in detail with reference to the accompanying drawings, which show an embodiment of a motor drive apparatus provided in an electric power steering apparatus for assisting steering operation in a vehicle.

Figure 1:
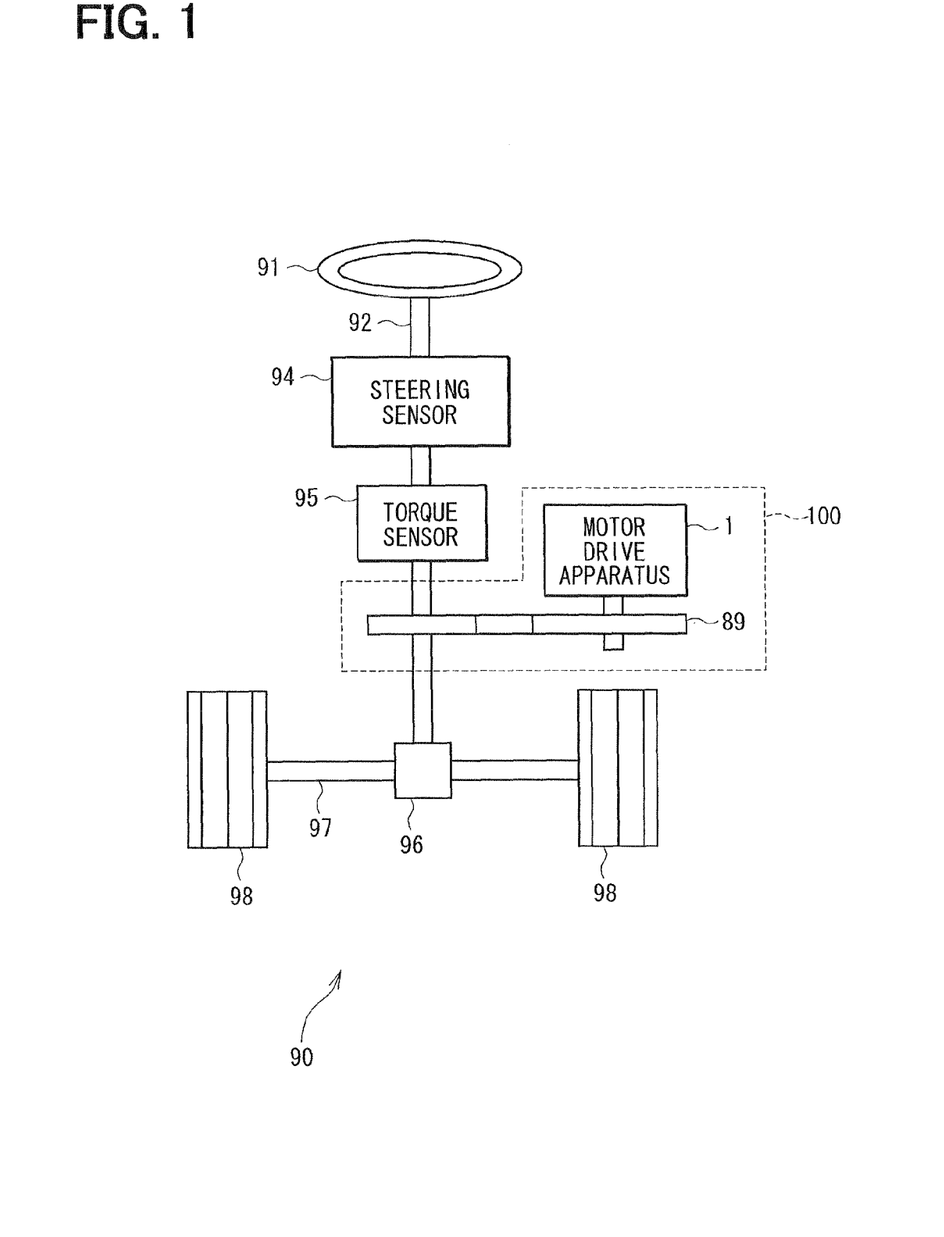
FIG. 1 is a schematic illustration of an electric power steering apparatus using a motor drive apparatus according to the present invention.

As shown in FIG. 1, a steering apparatus 90 includes an electric power steering apparatus 100. A steering sensor 94 and a torque sensor 95 are attached to a steering shaft 92, which is coupled to a steering wheel 91, for detecting a steering torque. The steering sensor 94 is provided to detect a rotation angle of the steering shaft. The torque sensor 95 is provided to detect steering torque applied to the steering wheel 91. A pinion gear 96 is provided on one longitudinal end of the steering shaft 92 and in engagement with a rack shaft 97. A pair of tire wheels 98 is coupled to both ends of the rack shaft 97 through tie rods, etc. The tire wheels 98 are rotatable.

When the steering wheel 91 is rotated by a driver, the rotary motion of the steering shaft 92 is translated into a linear motion of the rack shaft 97 by the pinion gear 96. The pair of tire wheels 98 is steered by an angle, which corresponds to a change in the linear motion of the rack shaft 97.

The electric power steering apparatus 100 includes a motor drive apparatus 1 and a reduction gear 89. The motor drive apparatus 1 includes an electric motor 10 (FIG. 2), which generates steering assist torque, and other components such as a rotation angle sensor for detecting the angular position of the motor 10. The reduction gear 89 is for transferring the torque of the motor 10 to the steering shaft 92 by speed-reducing the rotation of the motor 10. The motor 10 is a three-phase brushless motor and configured to rotate the reduction gear 89 in the forward or rearward direction. With this configuration, the electric power steering apparatus 100 generates the steering assist torque in the steering direction and steering torque of the steering wheel 91 and transfers it to the steering shaft 92 thereby to power-assist steering of the steering wheel 91.

Figure 2:
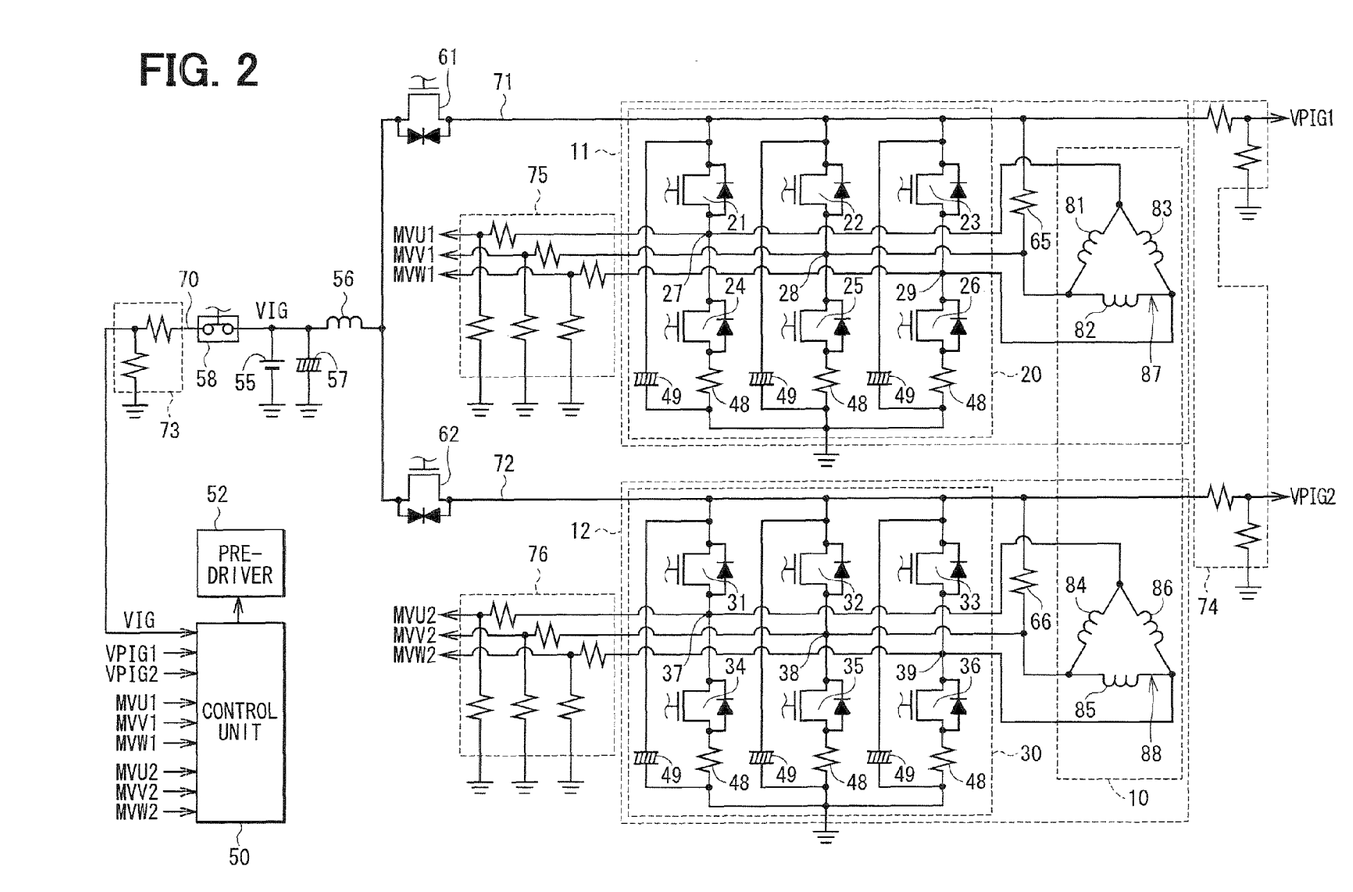
FIG. 2 is a circuit diagram of one embodiment of the motor drive apparatus shown in FIG. 1.

As shown in FIG. 2, the motor 10 is a brushless motor. The motor 10 has magnetic poles on the rotor side and two three-phase winding sets on the stator side. One of the two three-phase winding sets includes a U1 coil 81, a V1 coil 82 and a W1 coil 83. The other of the two winding sets includes a U2 coil 84, a V2 coil 85 and a W2 coil 86. The U1 coil 81, the V1 coil 82 and the W1 coil 83 form a first winding set 87. The U2 coil 84, the V2 coil 85 and the W2 coil 86 form a second winding set 88. Each of the first winding set 87 and the second winding set 88 is configured in a delta shape.

The motor drive apparatus 1 is provided with a plurality of (as many as "n") motor drive parts 11, 12, an electronic control unit 50, a pre-driver 52 and the like. "n" is an integer, which is equal to or greater than 2. In this embodiment, the motor drive apparatus 1 is provided with two drive systems, that is, a first drive system and a second drive system, which are provided in parallel and include a first motor drive part 11 and a second motor drive part 12, respectively. Same or similar components in the first and the second drive systems are similarly distinguished by "first" and "second" from each other. In case that three or more drive systems are provided, the same or similar arrangements are provided in parallel.

The motor drive apparatus 1 includes a battery (DC power source) 55, a first power supply relay 61, a second power supply relay 62, the first motor drive part 11, the second motor drive part 12, the control unit 50 and the like. The first power supply relay 61 and the second power supply relay 62 operate as electric power interruption sections, respectively. The first motor drive part 11 and the second motor drive part 12 operate as motor drive parts, respectively.

The battery 55 supplies the motor drive apparatus 1 with DC electric power. The electric power supplied from the battery 55 is supplied to a first power supply line 71 through a filter circuit, which is formed of a choke coil 56 and a smoothing capacitor 57, and the first power supply relay 61. The first power supply line 71 extends from an output of the first power supply relay 61. The first motor drive part 11 is connected to the first power supply line 71. The filter circuit is provided to suppress noises generated by the operation of the motor drive parts 11 and 12 from being transmitted to other devices, which are also supplied electric power from the same battery 55. The electric power supplied from the battery 55 is also supplied to a second power supply line 72 through the filter circuit and the second power supply relay 62. The second power supply line 72 extends from an output of the second relay 61. The second motor drive part 12 is connected to the second power supply line 72.

The first motor drive part 11 and the second motor drive part 12 drive the motor 10 by electric power supplied from the battery 55. The first motor drive part 11 includes a first inverter 20, a first winding set 87 and a first pull-up resistor 65, which connects the first winding set 87 to the first power supply line 71 for voltage application to the first winding set 87. The second motor drive part 12 includes a second inverter 30, a second winding set 88 and a second pull-up resistor 66, which connects the second winding set 88 to the second power supply line 72 for voltage application to the second winding set 88. The first inverter 20 and the second inverter 30 operate as an inverter part. The first winding set 87 and the second winding set 88 operate as a winding set.

The first motor drive part 11 and the second motor drive part 12 have thus the same configuration. The detailed description will therefore be made with reference to the first motor drive part 11 as an example.

The first inverter 20 is a three-phase inverter, which includes high-side (power source-side) FETs 21 to 23 and a low-side (ground-side) FETs 24 to 26. The FETs 21 to 26 are switching elements for switching the power supply to the U1 coil 81, the V1 coil 82 and the W1 coil 83 of the first winding set 87. The electric power is supplied from the battery 55 to the first inverter 20 through the first power supply line 71. In the second inverter 30 of the second motor drive part 12, high-side FETs 31 to 33, low-side FETs 34 to 36 and terminals 37 to 39 correspond to the high-side FETs 21 to 23, the low-side FETs 24 to 26 and the terminals 27 to 29 of the first inverter 20, respectively.

The high-side FETs 21 to 23 have respective drains connected to the first power supply line 71 and respective sources connected to drains of the low-side FETs 24 to 26. The low-side FETs 24 to 26 have respective sources and are grounded through shunt resistors 48, which form a current detection section, for detecting phase currents flowing to the U1 coil 81, the V1 coil 82 and the W1 coil 83 of the first winding set 87, respectively. Protective diodes are connected between the drains and the sources of the FETs 21 to 26 of the first inverter 20, respectively. An electrolytic capacitor 49 is connected between the power supply line 71 and the ground in parallel to the series connection of the high-side FET, the low-side FET and the resistor 48 in each phase. The capacitor 49 is an aluminum electrolytic capacitor, which is provided to store electric charge and supplement supply of electric power to the FETs 21 to 26. It also removes noise components such as surge currents.

It is assumed here that the three phases are the U-phase, the V-phase and the W-phase. In the U-phase, the source of the high-side FET 21 and the drain of the low-side FET 24 are connected to a U1 terminal 27. The U1 terminal 27 is connected to one end of the U1 coil 81. In the V-phase, the source of the high-side FET 22 and the drain of the low-side FET 25 are connected to a V1 terminal 28. The V1 terminal 28 is connected to one end of the V1 coil 82. In the W-phase, the source of the high-side FET 23 and the drain of the low-side FET 26 are connected to a W1 terminal 29. The W1 terminal 29 is connected to one end of the W1 coil 83.

The pull-up resistor 65 applies a power supply voltage to the first winding set 87 independently of the first inverter 20. The pull-up resistor 65 is connected to the power supply line 71 at its one end and connected to the terminals 27 to 29 at its other end through the first winding set 87. The terminals 27 to 29 are also connected to an A/D conversion section (not shown) of the control unit 50 through an interface circuit 75. In this embodiment, the resistance of the pull-up resistor 65 is set to be equal to a sum of resistances of two voltage-dividing resistors connected to each of the terminals 27, 28 and 29.

Thus, the control unit 50 receives and detects a U1 terminal voltage MVU1, a V1 terminal voltage MVV1 and a W1 terminal voltage MVW1 through the interface circuit 75. The U1 terminal voltage MVU1 is developed between the U1 terminal 27 and the ground. The V1 terminal voltage MVV1 is developed between the V1 terminal 28 and the ground. The W1 terminal voltage MVW1 is developed between the W1 terminal 29 and the ground.

As described above, the battery 55 supplies the motor drive apparatus 1 with the DC electric power. The positive terminal of the battery 55 is connected to the first power supply line 71 through the filter circuit, which is formed of the choke coil 56 and the smoothing capacitor 57, and the first power supply relay 61. The first motor drive part 11 is connected to the first power supply line 71. The positive terminal of the battery 55 is also connected to the second power supply line 72 through the filter circuit and the second power supply relay 62. The second motor drive part 12 is connected to the second power supply line 72. The positive terminal of the battery 55 is also connected to a power supply line 70 through an ignition switch 58. The negative terminal of the battery 55 is grounded.

Each of the first power supply relay 61 and the second power supply relay 62 is controlled to turn on and off by control signals applied from the control unit 50 through the pre-driver 52. The ignition switch 58 is a switch, which is turned on or off by an operation of an ignition key. With the ignition switch 58 being turned on, the control unit 50 is enabled to check whether any failure is present in each motor drive part and control the power supply to each motor drive part.

When the first power supply relay 61 and the second power supply relay 62 are turned on by the control unit 50 after the ignition switch 58 is turned on, the electric power is supplied from the battery 55 to the first power supply line 71 and the second power supply line 72. The first motor drive part 11 and the second motor drive part 12 are thus supplied with electric power.

The first power supply relay 61 is turned off immediately by the control unit 50, when the control unit 50 detects failure (abnormality) in the first motor drive part 11 by its failure check processing. The power supply from the battery 55 to the first motor drive part 11 is thus interrupted by the first power supply relay 61. The second power supply relay 62 is turned off immediately by the control unit 50, when the control unit 50 detects failure (abnormality) in the second motor drive part 12 by its failure check processing. The power supply from the battery 55 to the second motor drive part 12 is thus interrupted by the second power supply relay 62. Further, when the ignition switch 58 is turned off by the ignition key, the first power supply relay 61 and the second power supply relay 62 are both turned off by the control unit 50.

The filter circuit formed by the choke coil 56 and the smoothing capacitor 57 is provided to suppress noises, which are generated in driving the first motor drive part 11 and the second motor drive part 12, from being applied to other electric devices, which are supplied with electric power from the same battery 55.

The power supply line 70 is connected to the A/D conversion section of the control unit 50 through an interface circuit 73. Thus, the control unit 50 receives and detects a power supply line voltage VIG.

The first power supply line 71 and the second power supply line 72 are connected to the A/D conversion section of the control unit 50 through an interface circuit 74. Thus, the control unit 50 receives and detects a first relay output power voltage VPIG1 of the first power supply line 71 and a second relay output power voltage VPIG2 of the second power supply line 72.

The control unit 50 includes a microcomputer, which is programmed to control entire operation of the motor drive apparatus 1.

The control unit 50 is connected to the pre-driver 52. The pre-driver 52 is connected to gates of the FETs 21 to 26 of the first inverter 20 and gates of the FETs 31 to 36 of the second inverter 30. The pre-driver 52 is connected also to gates of the first power supply relay 61 and the second power supply relay 62. Signal lines, which apply gate control signals from the pre-driver 52 to the FETs 21 to 26, the FETs 31 to 36 and the relays 61, 62, are not shown in FIG. 2 for simplicity. The pre-driver 52 is formed of a charge pump circuit.

The control unit 50 determines the control signals based on a rotational position of the rotor of the motor 10 detected by a rotation angle sensor and phase currents detected by the resistors 48. The control unit 50 applies the control signals to the gates of the FETs 21 to 26 of the first inverter 20 through the pre-driver 52 thereby to control current supply to the coils 81 to 83 of the first winding set 87 by turning on and off the FETs 21 to 26 of the first inverter 20. The control unit 50 also applies control signals to the gates of the FETs 31 to 36 of the second inverter 30 through the pre-driver 52 thereby to control current supply to the coils 84 to 86 of the second winding set 88 by turning on and off the FETs 31 to 36 of the second inverter 30. The control unit 50 thus drives and controls the rotation of the motor 10.

The control unit 50 is configured to detect the power supply line voltage VIG, the first relay output power voltage VPIG1 and the second relay output power voltage VPIG2 through respective interface circuits 73 and 74. The control unit 50 is configured to detect the U1 terminal voltage MVU1, the V1 terminal voltage MVV1 and the W1 terminal voltage MVW1 through the interface circuit 75. Similarly, the control unit 50 is configured to detect the U2 terminal voltage MVU2, the V2 terminal voltage MVV2 and the W2 terminal voltage MVW2 through the interface circuit 76.

The control unit 50 is configured to check whether any failure is present in the first motor drive part 11 and the second motor drive part 12 based on voltages detected through the interface circuits 73, 74, 75 and 76. The control unit 50 is configured to execute two failure detection processing for each of the motor drive parts. The control unit 50 executes first failure detection processing and second failure detection processing for each motor drive part, for example. The failure detection processing for the first drive part 11 and the second drive part 12 are the same and hence the failure detection processing is described with reference to the first motor drive part.

In the first failure detection processing, the first power supply relay 61 is turned on to supply the electric power to each motor drive part after confirming that the first power supply relay 61 has no short-circuit failure. The short-circuit failure is caused by welding (adhesion of melting) of relay contacts in the power supply relay 61.

Figure 3:
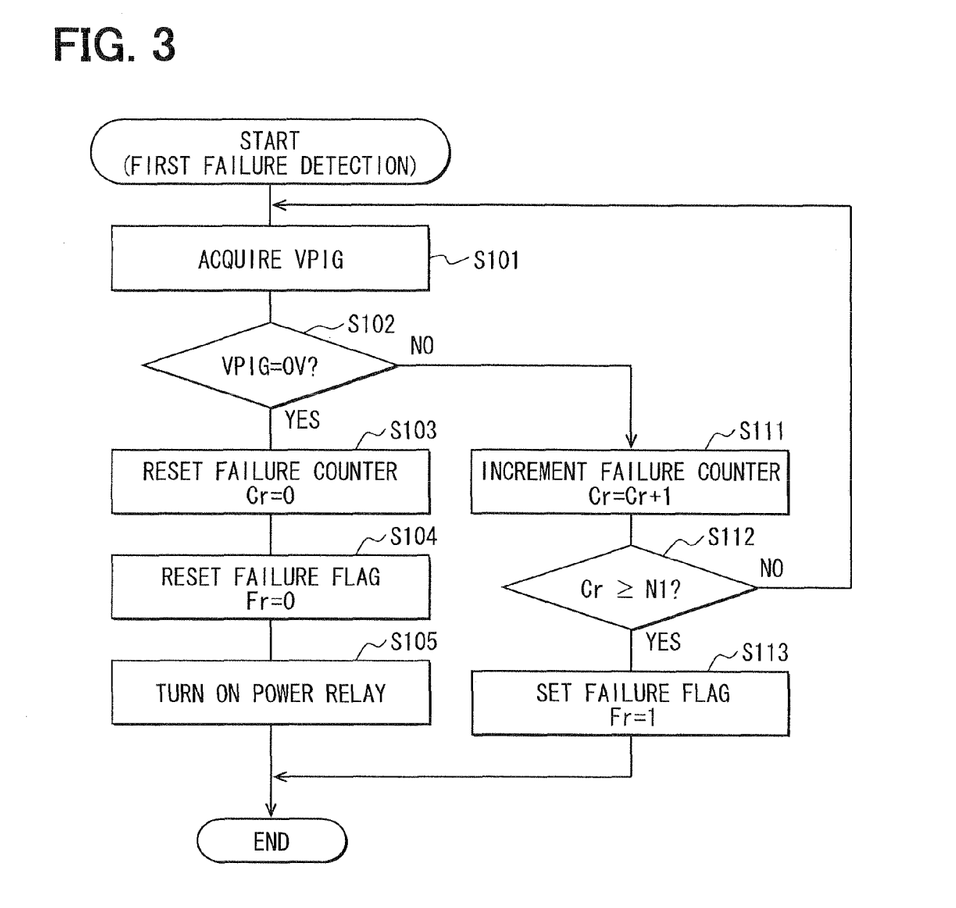
FIG. 3 is a flowchart showing first failure detection processing executed by the motor drive apparatus shown in FIG. 2.

The first failure detection processing is shown as a flowchart in FIG. 3, in which S denotes a step. This processing is executed when the motor drive apparatus 1 starts its operation when the ignition switch 58 is turned on by the control unit 50 in response to manipulation of a driver on the ignition key. The first power supply relay 61 is normally controlled to the turned-off state before the motor drive apparatus 1 starts its operation.

Referring to FIG. 3, first at S101, the first relay output power voltage VPIG1 is acquired. At S102, it is checked whether the acquired output voltage VPIG1 is 0V. This checking may be made as to whether the output voltage VPIG1 is close to 0. Since the first power supply relay 61 is a normallyopen relay, the voltage VPIG1 is about 0V as long as the first power supply relay 61 is has no failure. If the determination at S102 is YES, S103 is executed.

A failure counter is reset (Cr=0) at S103 and S104 is then executed. The count Cr is used to indicate the number of times of determination of the failure of the first power supply relay 61. The count Cr thus increases as the failure persists. At S104, a relay failure flag is reset (Fr=0) to indicate that the relay contacts of the first power supply relay 61 are not melted to adhere each other. Then, at S105, the first power supply relay 61 is controlled to the turned-on state so that the electric power is supplied to the first motor drive part 11.

If the determination at S102 is NO, the failure counter is incremented (Cr=Cr+1) at S111 and S112 is executed. At S112, it is checked whether the count Cr of the failure counter is equal to or greater than a predetermined count N1. If the determination is NO, the above processing is repeated again from S101. The determination of NO at S112 indicates that the detected failure may be just temporary. Thus erroneous determination is prevented from being caused by accidental drop of the output voltage VIPG1. If the determination is NO as many as N1 or more times at S102, the check at S112 results in YES. In this case, the failure flag Fr is set (Fr=1) to indicate that the relay contacts of the first power supply relay 61 are melted to adhere each other. After S105 or S113, the first failure detection processing is finished.

As described above, since the first power supply relay 61 is normally in the turned-off state, the first relay output power voltage VPIG1 is about 0V as long as the first power supply relay 61 is normal. If the first power supply relay 61 has a short-circuit failure because of welding of its relay contacts, the first relay output power voltage VPIG1 becomes generally equal to the power supply line voltage VIG. Based on this difference of the first relay output power voltage VPIG1, the failure of the first power supply relay 61, that is, welding of relay contacts in the first power supply relay 61, is detected at S102.

The second failure detection processing is executed to check whether any short circuit failure is present in the first motor drive part 11, that is, the first inverter 20 and the first motor winding set 87. This failure detection processing is shown as a flowchart in FIG. 4, and executed after the execution of the first failure detection processing shown in FIG. 3.

Figure 4:
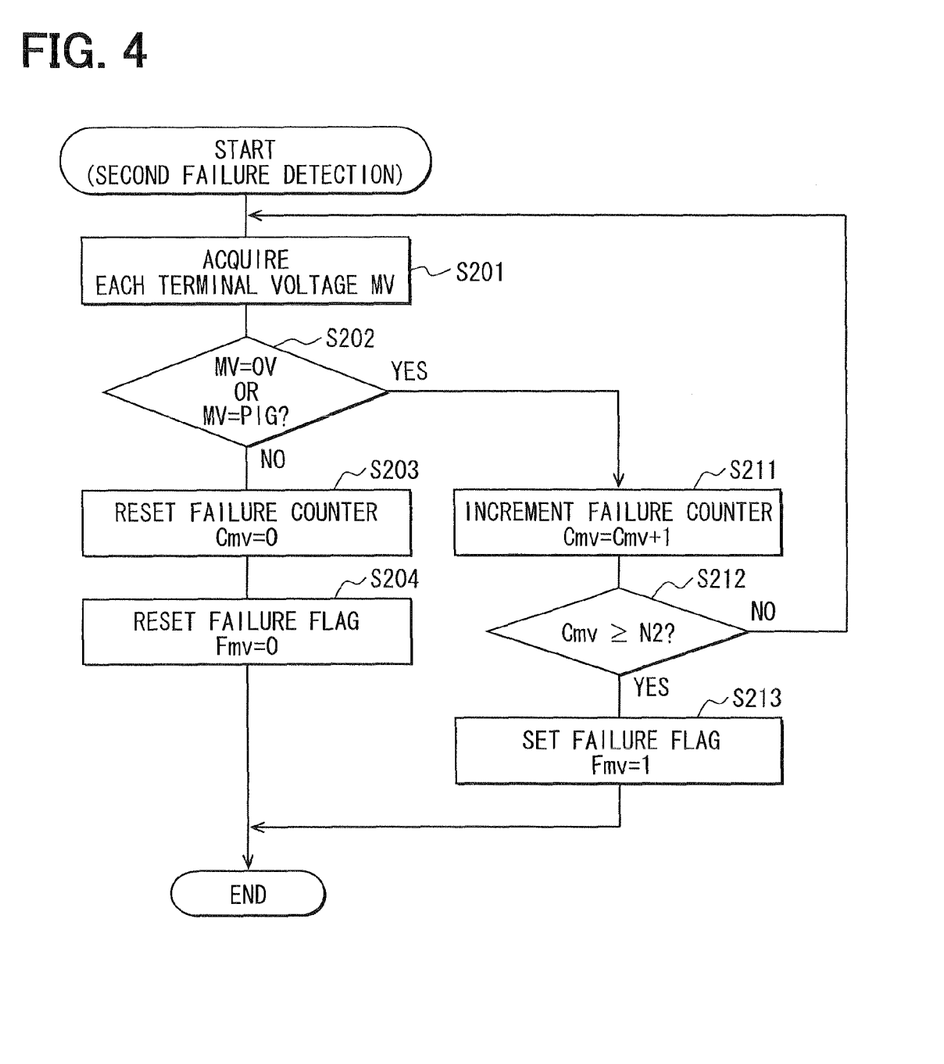
FIG. 4 is a flowchart showing second failure detection processing executed by the motor drive apparatus shown in FIG. 2.

Referring to FIG. 4, first at S201, the terminal voltage MV of each phase of the first motor drive part 11, that is, the U1 terminal voltage MVU1, the V1 terminal voltage MVV1 and the W1 terminal voltage MVW1, is acquired. At S202, it is checked whether the acquired each terminal voltage MV is 0V or equivalent to the first power supply relay output voltage VPIG1. If the determination is NO, a failure counter is reset (Cmv=0) at S203 and then S204 is executed. The count Cmv is used to indicate the number of times of determination of the short-circuit failure. The count Cmv thus increases as the short-circuit failure persists. At S204, an inverter or winding failure flag is reset (Fmv=0). Thus, it is determined that the first inverter 20 and the first winding set 87 are normal and have no short-circuit failure.

If the determination at S202 is YES, the failure counter is incremented (Cmv=Cmv+1) at S211 and then S212 is executed. At S212, it is checked whether the count Cmv of the failure counter is equal to or greater than a predetermined count N2. If the determination is NO, the above processing is repeated again from S201. The determination of NO at S212 indicates that the detected failure may be just temporary. Thus erroneous determination is prevented from being caused by accidental change of each terminal voltage VM. If the determination is YES as many as N2 or more times at S212, the check at S212 results in YES. In this case, the failure flag Fmv is set (Fmv=1) to indicate that the first inverter 20 or the first winding set 87 is finally determined to be in failure. After S204 or S213, the second failure detection processing is finished.

Regarding the U-phase, for example, if the U1 coil 81 is short-circuited to the ground or the low-side FET 24, to which the U1 coil 81 is connected, is short-circuited, the U1 terminal voltage MVU1, which is developed at the terminal 27, falls to 0 V. If the U1 coil 81 is short-circuited to the first power supply line 71 or the high-side FET 21 is short-circuited, to which the U1 coil 81 is connected, the U1 terminal voltage MVU1, which is developed at the terminal 27, rises to be equal to or close to the first relay output power voltage VPIG1. The same situation also arises with respect to the V-phase and the W-phase. Based on this difference of each terminal voltage MV, the failure of the first inverter part 20 and the first winding set 87 is detected at S202.

The control unit 50 is configured to start driving of the motor 10 in the following way. Specifically, the control unit 50 executes the first failure detection processing and the second failure detection processing with respect to the first motor drive part 11. After completing the two failure detection processing, the control unit 50 outputs control signals to the gate terminals of the FETs 21 to 26 of the first inverter 20 and supplies electric current to the first winding set 87 by the first inverter 20. Thus, the control unit 50 starts driving the motor 10. Similarly, after completing the two failure detection processing with respect to the second motor drive part 12, the control unit 50 outputs control signals to the gate terminals of the FETs 31 to 36 of the second inverter 30 and supplies electric current to the second winding set 87 by the second inverter 30. Thus, the control unit 50 starts driving the motor 10. The motor 10 is thus started to operate by the two motor drive parts, which are the first motor drive part 11 and the second motor drive part 12.

In addition, the control unit 50 starts to supply the currents to the first winding set 87 and the second winding set 88 at the same time after completion of all the two failure detection processing executed with respect to the first motor drive part 11 and the second motor drive part 12.

Figure 5:
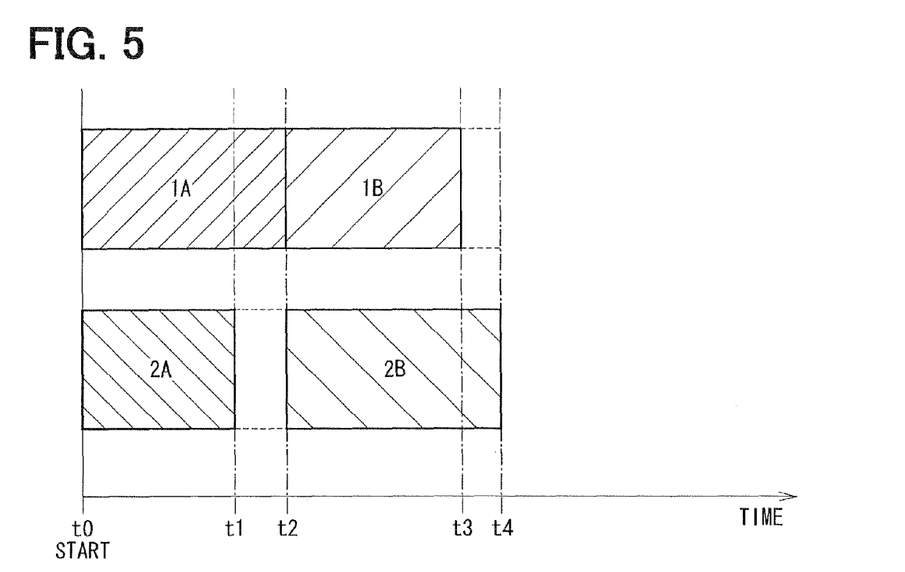
FIG. 5 is a time chart showing a first example of a failure detection operation of the motor drive apparatus shown in FIG. 2.

A first example of this processing is shown in FIG. 5. The first failure detection processing and the second failure detection processing are indicated as processing A and processing B, respectively. Further, the two processing A and B with respect to the first motor drive part 11 are indicated as processing 1A and processing 1B, respectively. Similarly, the two processing A and B with respect to the second motor drive part 12 are indicated as processing 2A and processing 2B, respectively.

In the first example shown in FIG. 5, the control unit 50 starts the processing 1A and 2A at the same time t0. The control unit 50 completes the processing 2A at time t1 and the processing 1A at time t2, which is later than time t1. The control unit 50 starts the processing 1B and 2B at the same time t2 after waiting for the completion of the processing 1A, which lasts after time t1. The control unit 50 completes the processing 1B at time t3 and the processing 2B at time t4, which is later than time t3.

The control unit 50 starts to supply the currents to the first winding set 87 and the second winding set 88 at the same time t4 after waiting for the completion of the processing 2B. The control unit 50 thus outputs the control signals to the gates of the FETs of the first inverter 20 and the second inverter 30 to start the current supply to the first winding set 87 and the second winding set 88 for starting driving the motor 10.

As described above, according to the first example, the control unit 50 starts supplying the currents to the first winding set 87 of the first motor drive part 11 and the second winding set 87 of the second motor drive part 12 at substantially the same time by waiting for the completion of all the first failure detection processing and the second failure detection processing with respect to both of the first motor drive part 11 and the second motor drive part 12. Since the current supply to each motor drive part is started generally at the same time, the motor drive apparatus 1 can appropriately control the motor 10 even at time, which is immediately after starting to drive the motor 10.

Further, not only the current supply to each winding set of the motor 10 is started by waiting for the completion of all the second failure detection processing about all the motor drive parts, each second failure detection processing is started after waiting for the completion of all the first failure detection processing about all the motor drive parts. Thus, it is possible not to execute the second failure detection processing about one of the motor drive parts before the completion of the first failure detection processing about the other motor drive part. As a result, the program to be executed by the control unit 50 can be simplified and hence execution time of the program can be shortened. In addition, reliability of the program is improved and complicated arithmetic operation amount can be reduced.

Still further, the two failure detection processing are executed in parallel with respect to the first motor drive part 11 and the second motor drive part 12. The time required for executing the failure detection processing is thus shortened and hence the motor drive apparatus 1 can start driving the motor 10 in a short time.

The first failure detection processing and the second failure detection processing for each motor drive part are executed in parallel between the first motor drive part 11 and the second motor drive part 12. Since all the failure detection processing for the plurality of motor drive parts are executed in parallel, the failure detection processing can be completed in a short time.

The motor drive apparatus 1 is used in the electric power steering apparatus 100 of a vehicle. Since the motor 10 provides a sum of two torques provided by the first motor drive part 11 and the second motor drive part 12 as the steering assist torque even at time, which is immediately after starting to drive the motor 10 in the electric power steering apparatus 100.

Differently from the first example, the first failure detection processing and the second failure detection processing may be executed as follows.

Figure 6:
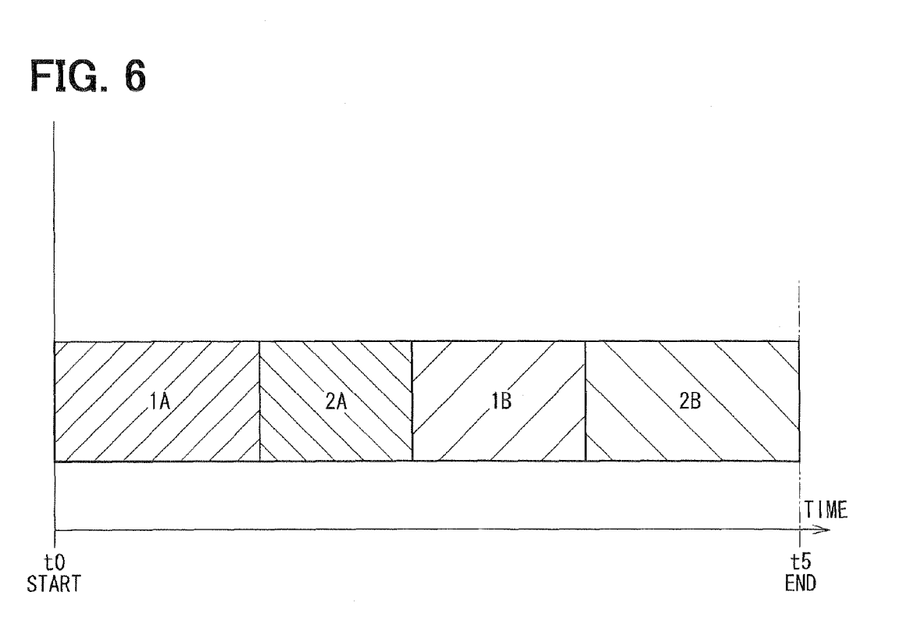
FIG. 6 is a time chart showing a second example of a failure detection operation of the motor drive apparatus shown in FIG. 2.

As a second example, the two failure detection processing A and B may be executed in series among the plurality of motor drive parts as shown in FIG. 6.

Specifically, as shown in FIG. 6, the control unit 50 starts execution of the processing 1A at time t0, the processing 2A after completion of the processing 1A, the processing 1B after completion of the processing 2A and finally the processing 2B after completion of the processing 1B. The processing 2B is completed at time t5. The control unit 50 starts to supply the electric currents to the first winding set 87 and the second winding set 88 at the same time t5 by waiting for the completion of the processing 2B, thereby starting driving the motor 10.

Although this second example needs a little longer time to complete all the failure detection processing, the control unit 50 starts to drive the motor 10 after all the failure detection processing are completed with respect to all the motor drive parts.

The program for executing the failure detection processing can be simplified and the reliability of the program can be improved.

Figure 7:
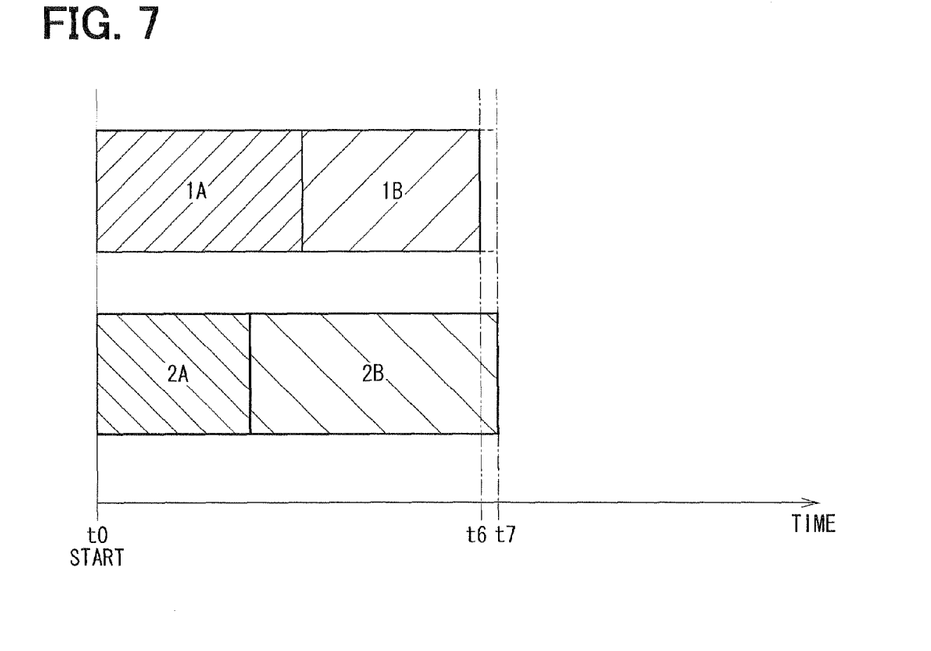
FIG. 7 is a time chart showing a third example of a failure detection operation of the motor drive apparatus shown in FIG. 2.

As a third example, as shown in FIG. 7, the control unit 50 starts to supply the currents to all the motor drive parts by waiting for the completion of the last failure detection processing, that is, the second failure detection processing. In this example, the control unit 50 starts execution of the second failure detection processing immediately after the completion of the first failure detection processing with respect to each motor drive part.

Specifically, as shown in FIG. 7, the control unit 50 starts execution of the processing 1A and the processing 2A in parallel at the same time t0. The control unit 50 starts to execute the processing 1B following the completion of the processing 1A. The control unit 50 completes execution of the processing 1B at time t6. The control unit 50 starts execution of the processing 2B following the completion of the processing 2A. The control unit 50 completes the execution of the processing 2B at time t7.

The control unit 50 starts to supply the electric currents to the first winding set 87 and the second winding set 88 at the same time t7 by waiting for the completion of the processing 2B, thereby starting driving the motor 10.

According to the third example, all the failure detection processing are executed in parallel, and hence all the failure detection processing can be completed in a short time.

Figure 8:
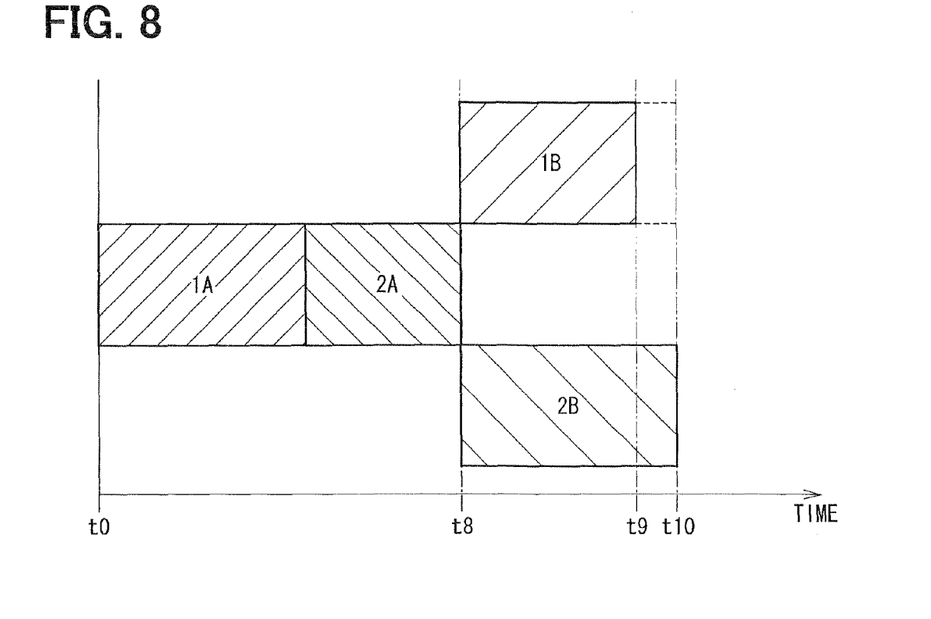
FIG. 8 is a time chart showing a fourth example of a failure detection operation of the motor drive apparatus shown in FIG. 2.

As a fourth example, as shown in FIG. 8, the control unit 50 executes one of the two failure detection processing in series among the plurality of motor drive parts and then the other of the two failure detection processing in parallel among the plurality of motor drive parts.

Specifically, as shown in FIG. 8, the control unit 50 starts execution of the processing 1A about the first motor drive part 11 and then starts execution of the processing 2A about the second motor drive part 12 after the completion of the processing 1A. The control unit 50 completes the processing 2A at time t8. The control unit 50 starts both processing 1B and 2B at the same time t8. The control unit 50 completes the processing 1B at time t9 and the processing 2B at time t10, which is later than time t9. The control unit 50 starts driving the motor 10 by supplying the electric currents to the first winding set 87 and the second winding set 88 at the same time t10 after waiting for the completion of the processing 2B.

Figure 9:
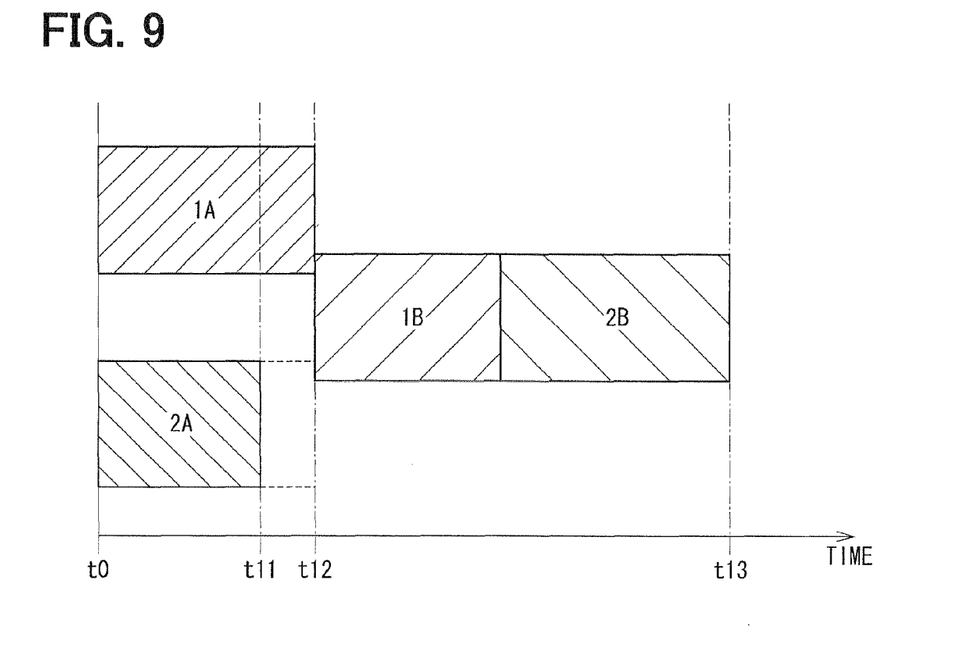
FIG. 9 is a time chart showing a fifth example of a failure detection operation of the motor drive apparatus shown in FIG. 2.

As a fifth example, as shown in FIG. 9, the control unit 50 starts to execute the processing 1A and 1B at the same time t0. The control unit 50 completes the processing 2A at time t11 and the processing 1A at time t12, which is after time t11. The control unit 50 starts to execute the processing 1B at time t12, which is immediately after the completion of the processing 1A. The control unit 50 starts to execute the processing 2B following the completion of the processing 1B. The control unit 50 completes the processing 2B at time t13. The control unit 50 starts to drive the motor 10 by starting the current supply to the first winding set 87 and the second winding set 88 at the same time t13.

It is noted that in each of the examples the control unit 50 starts to drive the motor 10 after the completion of all the failure detection processing with respect to each motor drive part of the motor 10.

The present invention is not limited to the disclosed embodiment and examples, but may be implemented in different embodiments and examples. The present invention may be implemented in a motor drive apparatus, which includes as many as "n" motor drive parts and executes as many as "m" failure detection processing for each of "n"

motor drive parts, with "n" being an integer equal to or more than 2 and "m" being an integer equal to or more than 1.

What is claimed is:

1. A motor drive apparatus comprising:
a plurality of motor drive parts including as many as "n" motor drive parts, each of the motor drive parts including a winding set of a motor and an inverter for supplying current to the winding set, "n" being an integer equal to or greater than 2; and
a control unit configured to check whether failure is present with respect to each of the plurality of motor drive parts and control current supply to the winding set through the inverter in each of the plurality of motor drive parts,
wherein the control unit is configured to execute as many as "m" failure detection processing with respect to each of the plurality of motor drive parts before the inverter starts the current supply to the winding set in each of the motor drive parts, with "m" being an integer equal to or greater than 1, and
wherein the control unit is configured to start the current supply to each winding set of the plurality of motor drive parts at the same time after completion of execution of all the failure detection processing with respect to all of the plurality of motor drive parts.

2. The motor drive apparatus according to claim 1, wherein:
the control unit is configured to start "i+1"-th failure detection processing after waiting for the completion of execution of an "i"-th failure detection processing with respect to each of the plurality of motor drive parts, with "i" being an integer equal to or greater than 1 but equal to or less than "m−1."

3. The motor drive apparatus according to claim 1, wherein:
the control unit is configured to execute the failure detection processing in parallel among the plurality of motor drive parts.

4. The motor drive apparatus according to claim 3, wherein:
the control unit is configured to execute "j"-th failure detection processing in parallel among the plurality of motor drive parts, with "j" being an integer equal to or greater than 1.

5. The motor drive apparatus according to claim 1, wherein:
the control unit is configured to execute the failure detection processing in series among the plurality of motor drive parts.

6. The motor drive apparatus according to claim 5, wherein:
the control unit is configured to execute "k"-th failure detection processing in series, with "k" being an integer equal to or greater than 1 and equal to or less than "m."

7. The motor drive apparatus according to claim 1, wherein:
the motor is provided in an electric power steering apparatus.

8. The motor drive apparatus according to claim 7, wherein:
each of the motor drive parts further includes a power supply relay provided in a power supply line connecting the inverter and the winding set to a battery;
the inverter includes a plurality of FETs; and
the control unit is configured to check whether the power supply relay and the FETs are normal by turning off both the power supply relay and the FETs.

9. A motor drive apparatus comprising:
a plurality of motor drive parts including as many as "n" motor drive parts, each of the motor drive parts including a winding set of a motor and an inverter for supplying current to the winding set, "n" being an integer equal to or greater than 2; and
a control unit configured to check whether failure is present with respect to each of the plurality of motor drive parts and control current supply to the winding set through the inverter in each of the plurality of motor drive parts,
wherein the control unit is configured to execute as many as "m" failure detection processing with respect to each of the plurality of motor drive parts, with "m" being an integer equal to or greater than 1, and
wherein the control unit is configured to start the current supply to each winding set of the plurality of motor drive parts at the same time after completion of execution of all the failure detection processing with respect to all of the plurality of motor drive parts; and
wherein the control unit is configured to start "i+1"-th failure detection processing after waiting for the completion of execution of an "i"-th failure detection processing with respect to each of the plurality of motor drive parts, with "i" being an integer equal to or greater than 1 but equal to or less than "m−1."

* * * * *